US011980851B2

(12) United States Patent
Hungerford et al.

(10) Patent No.: US 11,980,851 B2
(45) Date of Patent: May 14, 2024

(54) APPARATUS FOR CONTROLLED RELEASE OF AN ERODIBLE SOLID INTO A LIQUID

(71) Applicant: Hydro Magic LLC, Port Orange, FL (US)

(72) Inventors: Kenneth Hungerford, Crescent City, FL (US); Paul Friedrich, Granite Falls, NC (US)

(73) Assignee: Hydro Magic LLC, Port Orange, FL (US)

( * ) Notice: Subject to any disclaimer, the term of this patent is extended or adjusted under 35 U.S.C. 154(b) by 0 days.

(21) Appl. No.: 18/179,558

(22) Filed: Mar. 7, 2023

(65) Prior Publication Data

US 2023/0201777 A1 Jun. 29, 2023

Related U.S. Application Data

(62) Division of application No. 17/352,839, filed on Jun. 21, 2021, now Pat. No. 11,623,186.

(51) Int. Cl.

*B01F 25/316* (2022.01)
*B01F 21/20* (2022.01)
*B01F 25/312* (2022.01)

(52) U.S. Cl.

CPC ............ *B01F 25/312* (2022.01); *B01F 21/22* (2022.01); *Y10T 137/4891* (2015.04); *Y10T 137/87587* (2015.04); *Y10T 137/87627* (2015.04)

(58) Field of Classification Search

CPC ....... Y10T 137/4891; Y10T 137/87587; Y10T 137/87619; Y10T 137/87627; Y10T 137/87635; B01F 21/22; B01F 25/316

See application file for complete search history.

(56) References Cited

U.S. PATENT DOCUMENTS

| | | | | |
|---|---|---|---|---|
| 1,887,836 | A * | 11/1932 | Faber | E03C 1/046 137/892 |
| 4,883,086 | A | 11/1989 | Lejnar | |
| 5,827,434 | A * | 10/1998 | Yando | C02F 1/505 210/764 |
| 6,230,987 | B1 | 5/2001 | Truong | |
| 6,453,935 | B1 | 9/2002 | Gilmore | |
| 7,661,607 | B1 * | 2/2010 | Bowden | E03C 1/046 239/581.1 |
| 8,517,056 | B2 | 8/2013 | Cullin | |
| 8,813,769 | B2 | 8/2014 | Gastauer et al. | |
| 9,022,073 | B2 | 5/2015 | Strauli | |

* cited by examiner

*Primary Examiner* — Kevin F Murphy

(74) *Attorney, Agent, or Firm* — Potomac Law Group, PLLC

(57) ABSTRACT

A dispenser assembly for controlled hydro-injection release of an erodible solid cartridge into a liquid. The dispenser assembly includes a fluid flow member with an inlet for attaching to a pressurized fluid line and an outlet. A hydro chamber with a hydro-injector member is provided in the fluid flow member. The hydro-injector member has an inlet opening which faces the inlet of the fluid flow member and outlet opening. A cartridge holding member is removably attached to the fluid flow member and is configured to house the erodible solid cartridge in an activation chamber. A plate is positioned in engagement with the hydro-injector member. An expandable member extends from the plate. The hydro-injector and the plate control the rate of erosion of the erodible solid cartridge.

18 Claims, 12 Drawing Sheets

APPARATUS FOR CONTROLLED RELEASE OF AN ERODIBLE SOLID INTO A LIQUID

CROSS REFERENCE TO RELATED APPLICATIONS

This application is a Divisional of and claims priority to U.S. application Ser. No. 17/352,839 filed on Jun. 21, 2021 which is incorporated herein by reference in its entirety.

FIELD OF THE INVENTION

The present invention relates generally to a dispensing apparatus and, more specifically, to a dispensing assembly that controllably releases an erodible solid into a liquid.

BACKGROUND OF THE INVENTION

The use of dispensing assemblies is well known in the art. However, the dispensing assemblies that are commercially available tend to be expensive, difficult to operate, and do not provide user variable levels of solution concentration. Various assemblies place a chemical capsule in direct contact with a spring in a housing. Once a cap is placed on the housing, it causes the spring to compress and thereby force the chemical capsule into direct contact with the fluid path. Such an arrangement does not permit concentration control.

In other assemblies, the concentration of the chemical to be dispersed is greater when the chemical is first placed in the assembly and the concentration is lessened as the chemical is dissolved. Such an arrangement does not provide a uniform concentration of the chemical in the liquid during use.

It would, therefore, be beneficial to provide a dispensing assembly which overcomes the deficiencies of the prior art and which maintains a desired, controlled and consistent concentration of the chemical in the liquid during use.

SUMMARY OF THE INVENTION

The present invention comprises a dispenser assembly that provides for a controlled release of an erodible solid into a liquid. The dispenser assembly of the present invention consists of a cartridge holding member, a fluid flow member, and a hydro-injector venturi system.

The fluid flow member is cylindrical and is securely attached to the cartridge holding member. This fluid flow member receives and maintains a solid erodible chemical capsule. When the dispenser is not in use, fluid drains from the upper chamber thereby terminating further capsule erosion.

An embodiment is directed to a dispenser assembly for controlled hydro-injection release of an erodible solid cartridge into a liquid. The dispenser assembly includes a fluid flow member with an inlet for attaching to a pressurized fluid line and an outlet. A hydro chamber is provided in the fluid flow member. The hydro chamber has a hydro-injector member positioned therein. The hydro-injector member has an inlet opening which faces the inlet of the fluid flow member and outlet opening. A cartridge holding member is removably attached to the fluid flow member and is configured to house the erodible solid cartridge in an activation chamber. A plate is positioned in engagement with the hydro-injector member. An expandable member extends from the plate. The expandable member is maintained proximate to or in contact with a top of the erodible solid cartridge to control the rate of erosion as the erodible solid cartridge is eroded.

An embodiment may include a hydro-injector member with a rotatable valve with a first flow chamber and a second flow chamber. The rotatable valve is attached, either directly or indirectly to a turnable member which can be engaged by an operator to rotate the turnable member and the rotatable valve between a first position and a second position. In the first position, the first flow chamber is positioned in line with the inlet of the fluid flow member, allowing all of the fluid which enters the inlet to be directed to the activation chamber. In the second position, the second flow chamber is positioned in line with the inlet of the fluid flow member, allowing all of the fluid which enters the inlet to be directed to the outlet of the fluid flow member, thereby allowing the fluid to bypass the activation chamber. In positions between the first position and the second position, the amount of fluid which enters the first flow chamber and the second flow chamber can be controlled by the positioning of the rotatable valve.

An embodiment is directed to a dispenser assembly for controlled hydro-injection release of an erodible solid cartridge into a liquid. The dispenser device includes a fluid flow member having an inlet for attaching to a pressurized fluid line and an outlet. A hydro chamber is provided in the fluid flow member, the hydro chamber has a hydro-injector member positioned therein. The hydro-injector member has an inlet opening which faces the inlet of the fluid flow member and outlet opening. A cartridge holding member is removably attached to the fluid flow member and is configured to house the erodible solid cartridge in an activation chamber. A plate is positioned in engagement with the hydro-injector member. A projection extends from the plate into the activation chamber. The projection has a first inlet opening and a second inlet opening. The first inlet opening directs fluid to a top of the cartridge to interact and dissolve the top of the cartridge and the second inlet opening directs fluid to a bottom of the cartridge to interact and dissolve the bottom of the cartridge.

Other features and advantages of the present invention will be apparent from the following more detailed description of the illustrative embodiment, taken in conjunction with the accompanying drawings which illustrate, by way of example, the principles of the invention.

BRIEF DESCRIPTION OF THE DRAWINGS

FIG. 19 is a cross-sectional of the fully assembled illustrating the controlled release apparatus of FIG. 15 with a fully intact cartridge positioned in an activation chamber of the cartridge holding member.

DETAILED DESCRIPTION OF THE INVENTION

Figure 1:
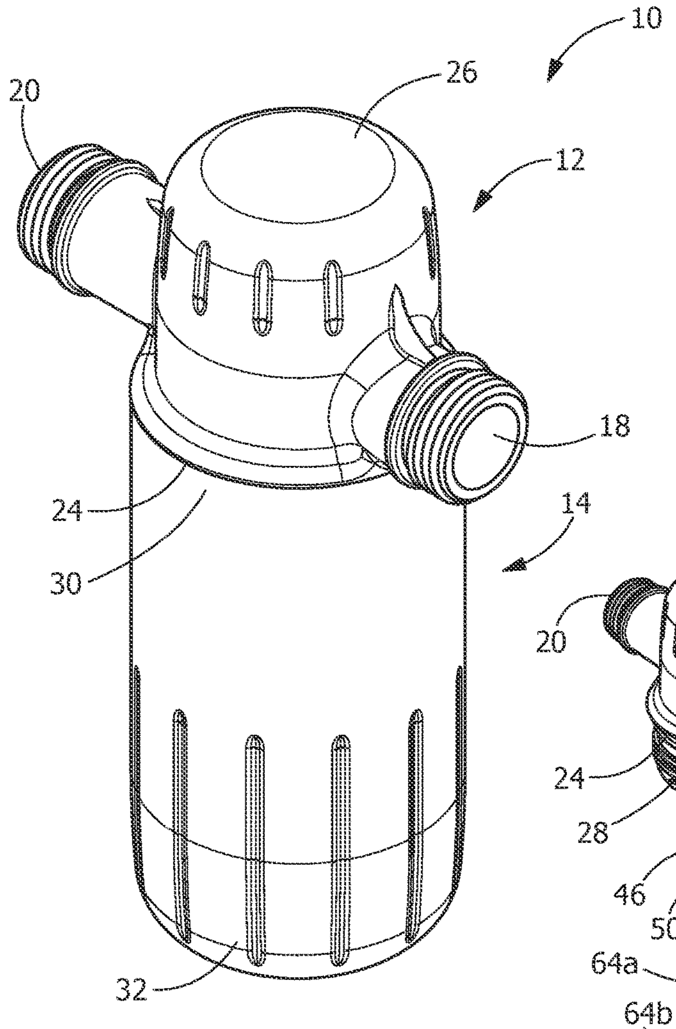
FIG. 1 is a perspective view of a first illustrative embodiment of a controlled release apparatus of the present invention.
Figure 2:
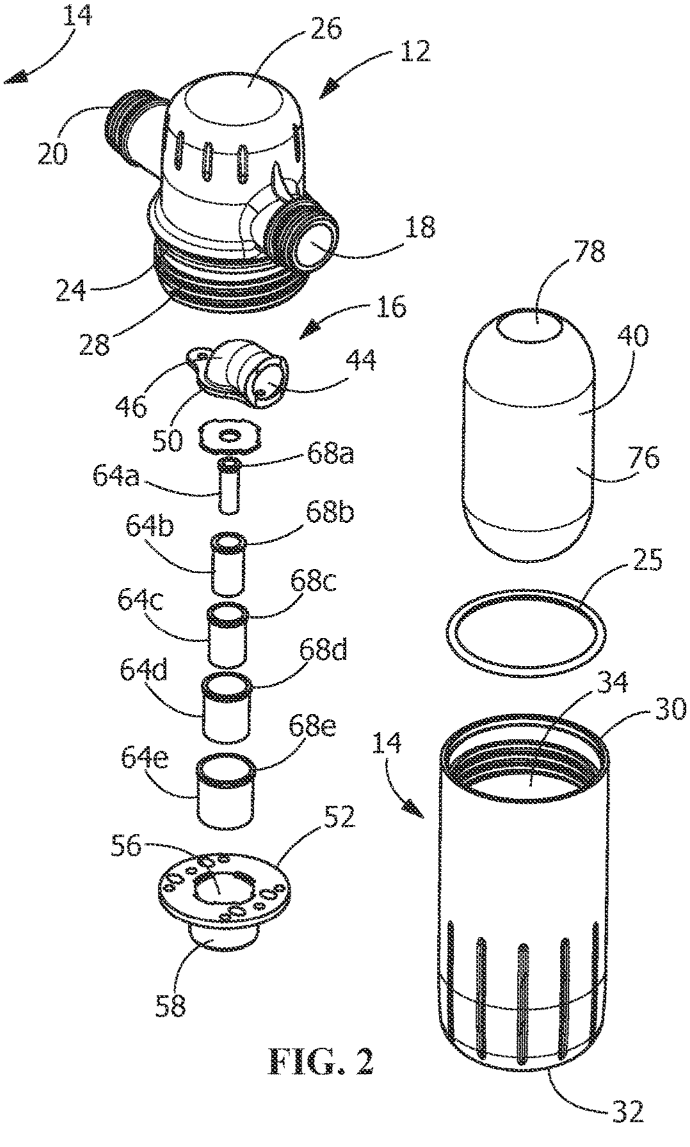
FIG. 2 is an exploded perspective view of the controlled release apparatus of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

An illustrative embodiment of a controlled release apparatus or dispenser assembly 10 is shown in FIGS. 1 through 9. The assembly 10 includes a fluid flow member 12, a cartridge holding member 14, and a hydro-injector venturi system 16. The components of the dispenser assembly can be fabricated from any durable material, such as, but not limited to: polymer (i.e., polyvinyl chloride) or polymer coated metal.

The fluid flow member 12 has an inlet 18, an outlet 20, and a hydro chamber 22. The inlet 18 and the outlet 20 can each be threaded. The inlet 18 is attachable to and removable from a pressurized fluid line, such as, but not limited to, a hose. The outlet 20 is attachable to and removable from a second fluid line, such as, but not limited to, a nozzle. While the inlet 18 and outlet 20 shown in the illustrative embodiment are threaded, other methods of attaching the assembly 10 may be used. In the illustrative embodiment shown, the inlet 18, the outlet 20 and the hydro chamber 22 are integrally molded in the fluid flow member 12.

The fluid flow member 12 has a lower surface 24 and an upper surface 26. Centrally located and extending outwardly from the lower surface 24 is a cylindrical receiving member 28 which receives the cartridge holding member 14. In the illustrative embodiment shown, the cylindrical receiving member 28.

An O-ring 25 (FIG. 2) may be located proximate the cylindrical receiving member 28. When assembled, the O-ring 25 engages the cartridge holding member 14 to provide a seal and prevent leakage when the cartridge holding member 14 is attached to the fluid flow member 12. Other types of seals may be used without departing from the scope of the invention.

The cylindrical receiving member 28 can be threaded to allows for the cartridge holding member 14 of the assembly 10 to be easily attached and removed from the fluid flow member 12. Other methods of attaching the cartridge holding member 14 of the assembly 10 to the fluid flow member 12 may be used.

The cartridge holding member 14 has a top portion 30, a bottom portion 32, and an activation chamber or cartridge receiving cavity 34. In the embodiment shown, the bottom portion 32 is integrally attached to the top portion 30. However, in other illustrative embodiments, the bottom portion 32 may have a cap (not shown) which is attachable to and removable from the top portion 30 to allow for the insertion of a chemical capsule or cartridge 40 (such as fertilizer or chlorine) into the activation chamber 34.

Figure 3:
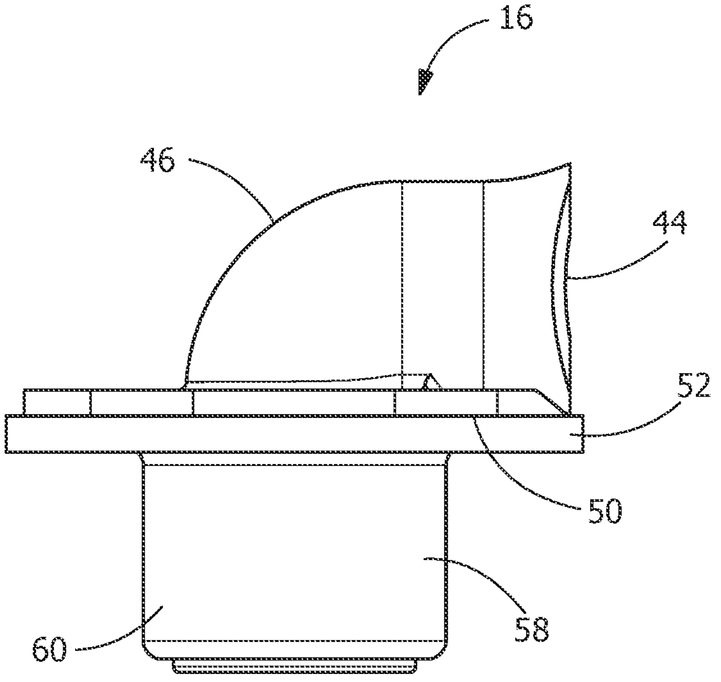
FIG. 3 is a side view of one example of a hydro-injector venturi system that can be used in the controlled release apparatus of FIG. 1.
Figure 4:
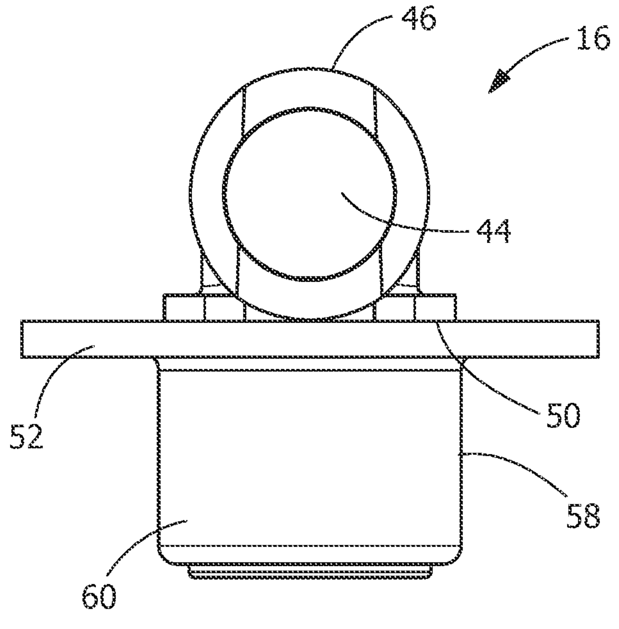
FIG. 4 is a frontal view of the hydro-injector venturi system illustrated in FIG. 3.
Figure 5:
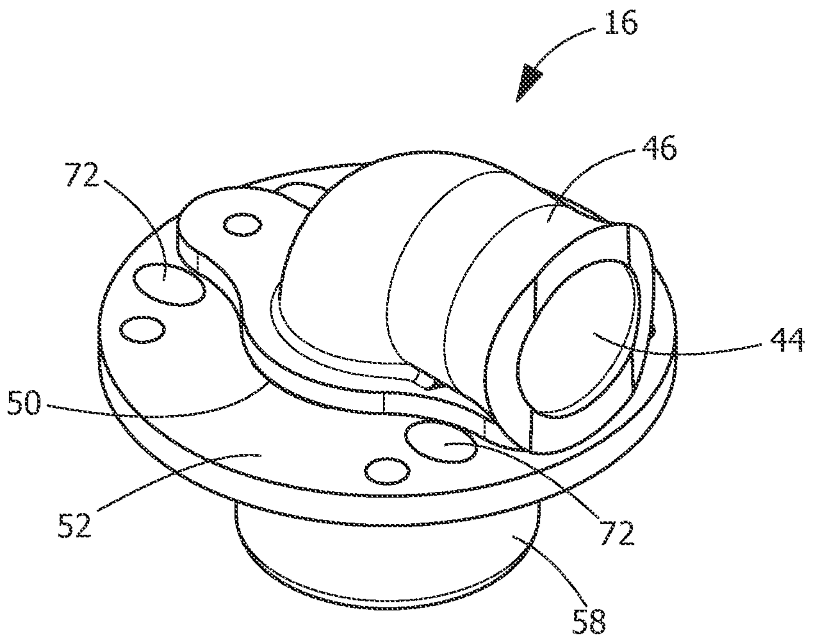
FIG. 5 is a top perspective view of a venturi plate and nozzle of the hydro-injector venturi system illustrated in FIG. 3, with the nozzle shown in the retracted position.
Figure 6:
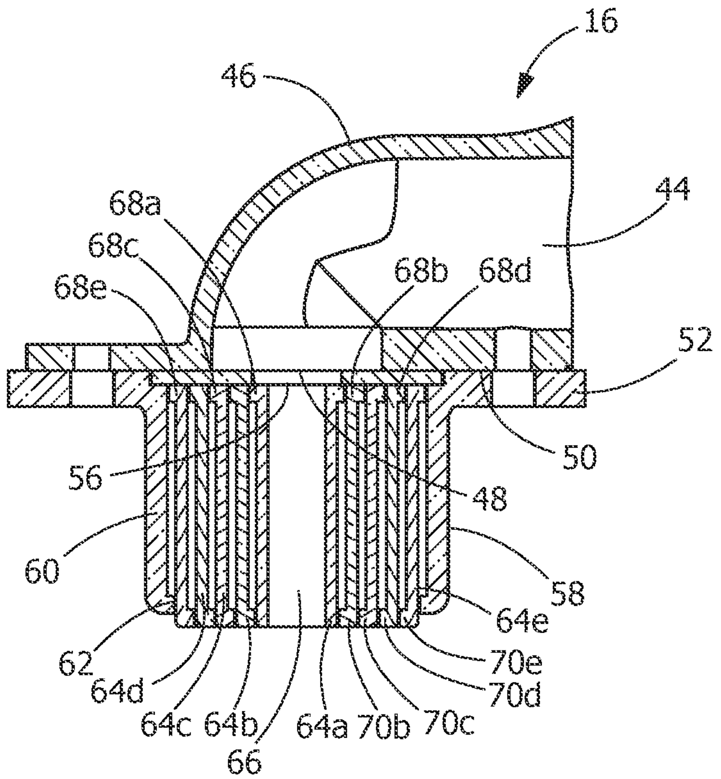
FIG. 6 is a cross-sectional view taken along line 6-6 of FIG. 5.
Figure 7:
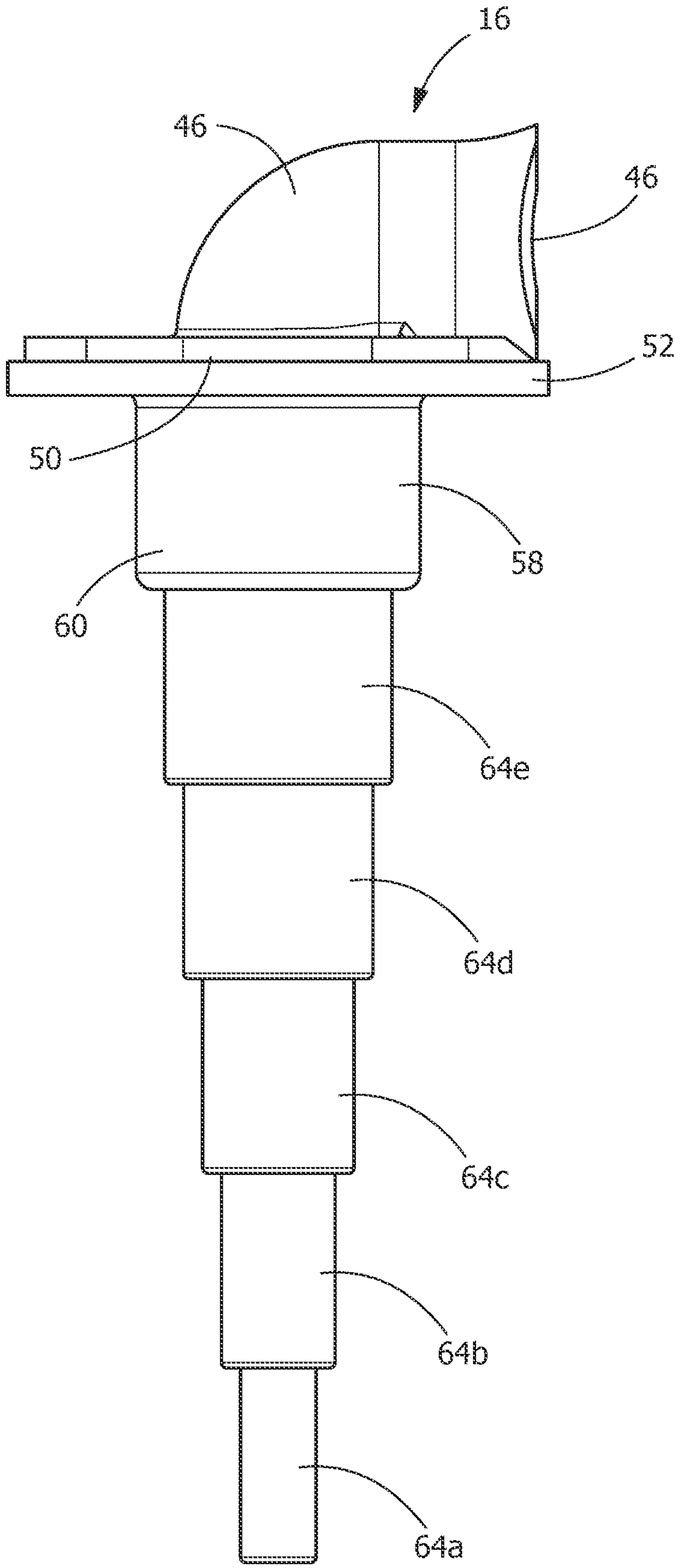
FIG. 7 is a top perspective view of a venturi plate and nozzle of the hydro-injector venturi system illustrated in FIG. 5, with the nozzle shown in the extended position.

The hydro-injector venturi system 16 is located within the cylindrical receiving member 28 and extends from the hydro chamber 22 of the fluid flow member 12 into the cartridge holding member 14. As shown in FIGS. 3 and 4, the illustrative hydro-injector venturi system 16 has a hydro-injector member 46 with an L-shape configuration. The hydro-injector member 46 has an inlet opening 44, which faces the inlet 18 of the fluid flow member 12. The hydro-injector member 46 has an outlet opening 48 (FIG. 6), which extends through a surface 50 of the hydro-injector member 46 which faces the activation chamber 34 of the cartridge holding member 14.

A venturi plate 52 is positioned in engagement with the surface 50 of the hydro-injector member 46. The venture plate is attached to the hydro-injector member 46 and the fluid flow member 12 by mounting hardware (not shown). However, other methods of attaching the venturi plate 52 and hydro-injector member 46 may be used.

An opening 56 extends through the venturi plate 52. In the illustrative embodiment shown, the opening 56 is provided proximate the center of the venturi plate 52, although other configurations of the venturi plate 52 may be used. When assembled, the opening 56 of the venturi plate 52 is positioned in alignment with the outlet opening 48 of the hydro-injector member 46.

Extending about the circumference of the opening 56 is a projection 58. The projection 58 is integrally formed from the venturi plate 52. The projection 58 is spaced from the opening 56 and extends from the venturi plate 52 into the activation chamber 34. The projection 58 has a wall 60 with a shoulder 62 provided at a free end thereof. In the embodiment shown, the projection 58 has a cylindrical configuration, but other configurations may be used.

Expandable members, in the form of movable or telescoping partitions 64 are provided in the projection 58. A first telescoping partition 64*a* has an opening 66 with an inner diameter which is smaller than the diameter of the opening 56. The first telescoping partition 64*a* has a first locking shoulder 68*a* which extends from first telescoping partition 64*a* in a direction away from the opening 66. In the embodiment shown, the partitions 64 have cylindrical configurations, but other configurations may be used.

Additional telescoping partitions 64*b*, 64*c*, 64*d*, 64*e* are positioned between the first telescoping partition 64*a* and the projection 58. The second telescoping partition 64*b* has an inner diameter which is larger than the inner diameter of the first telescoping partition 64*a*. The third telescoping partition 64*c* has an inner diameter which is larger than the inner diameter of the second telescoping partition 64*b*. The fourth telescoping partition 64*d* has an inner diameter which is larger than the inner diameter of the third telescoping partition 64*c*. The fifth telescoping partition 64*e* has an inner diameter which is larger than the inner diameter of the fourth telescoping partition 64*d* and smaller than the inner diameter of the projection 58.

Each of the telescoping partitions 64*b*, 64*c*, 64*d*, 64*e* has a first locking shoulder 68*b*, 68*c*, 68*d*, 68*e* which extends from the respective telescoping partitions 64*b*, 64*c*, 64*d*, 64*e* in a direction away from the opening 66. Each of the telescoping partitions 64*b*, 64*c*, 64*d*, 64*e* has a second locking shoulder ?Ob, 70*c*, 70*d*, ?0*e* which extends from the respective telescoping partition 64*b*, 64*c*, 64*d*, 64*e* in a direction toward from the opening 66. The first locking shoulders 68*b*, 68*c*, 68*d*, 68*e* are provided at an opposite end for the telescoping partitions 64*b*, 64*c*, 64*d*, 64*e* than the second locking shoulders ?Ob, 70*c*, 70*d*, ?0*e*.

Outlet openings 72 (FIG. 5) extend through the venturi plate 52. In the illustrative embodiment shown, four outlet openings 72 are provided. However, other numbers and positioning of the outlet openings 72 on the venturi plate 52 may be provided.

Figure 8:
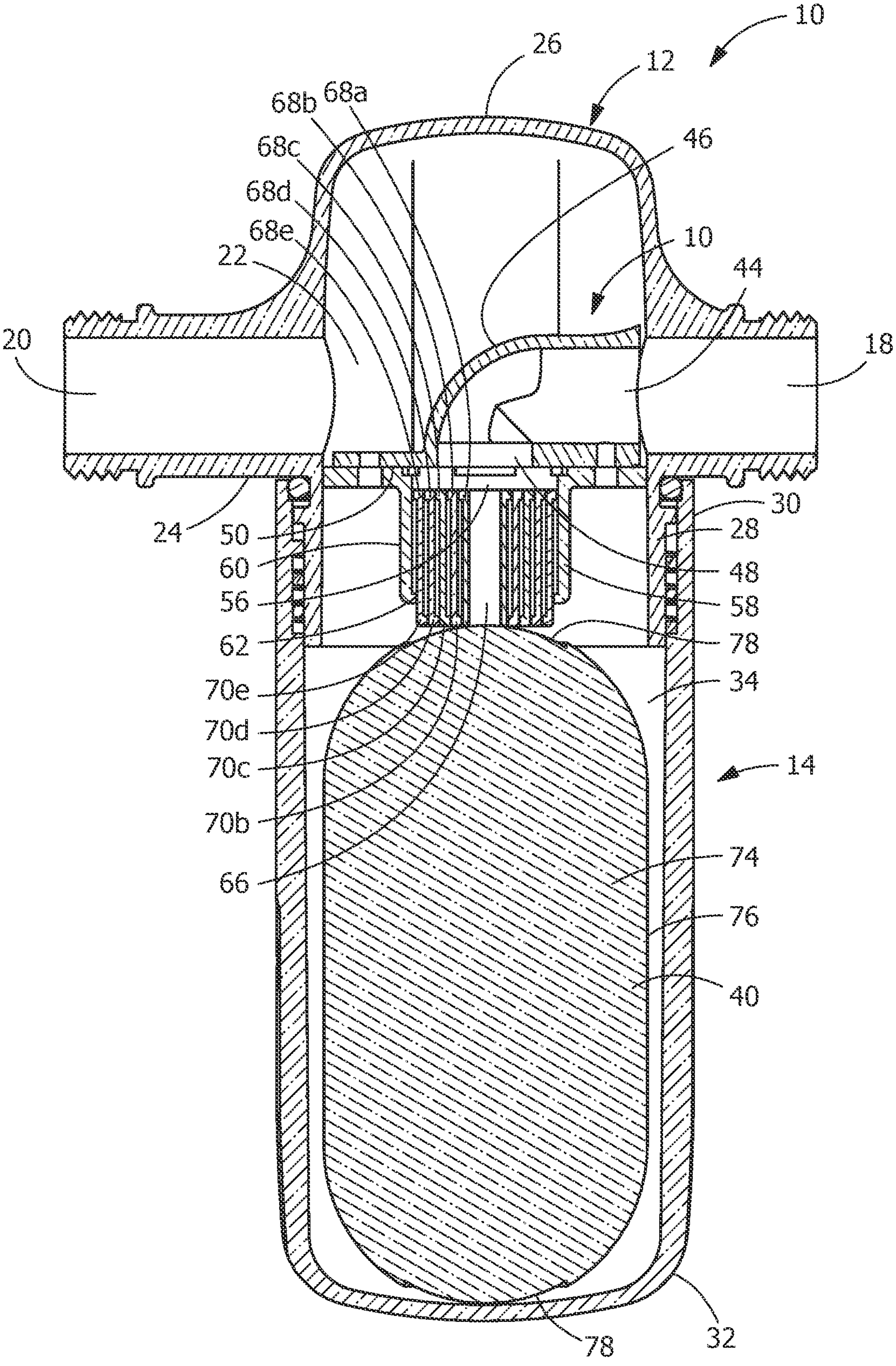
FIG. 8 is a cross-sectional view taken along line 8-8 of FIG. 1, illustrating the controlled release apparatus with a fully intact cartridge positioned in an activation chamber, the nozzle is shown in the retracted position.
Figure 9:
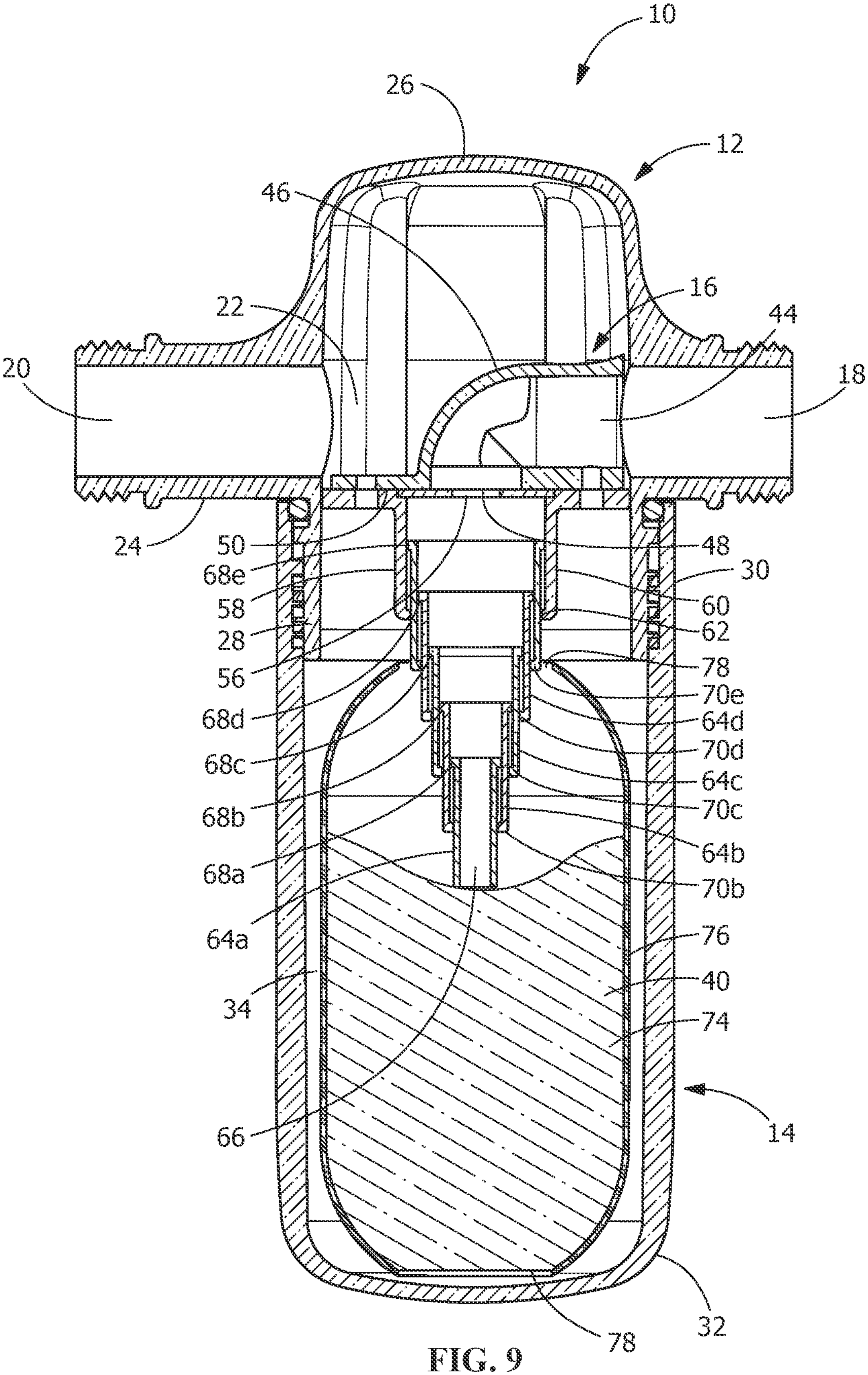
FIG. 9 is a cross-sectional view similar to that of FIG. 8, illustrating the controlled release apparatus with a partially dissolved cartridge positioned in the activation chamber, the nozzle is shown in the partially extended position.
Figure 10:
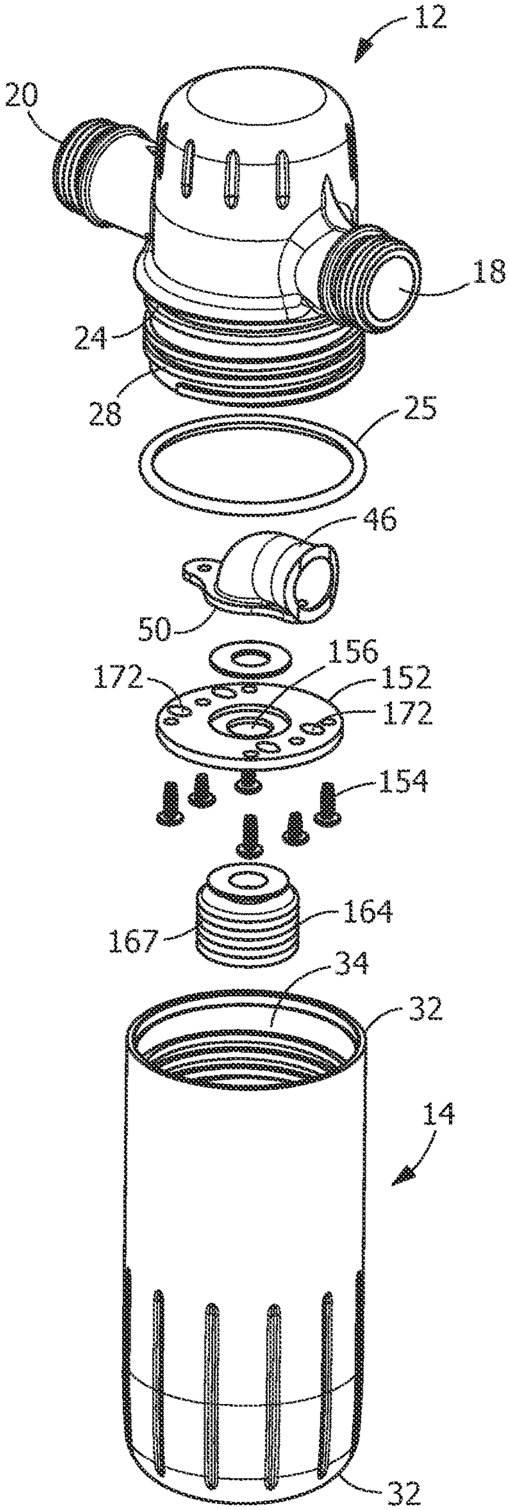
FIG. 10 is an exploded perspective view of a second illustrative embodiment of a controlled release apparatus.
Figure 11:
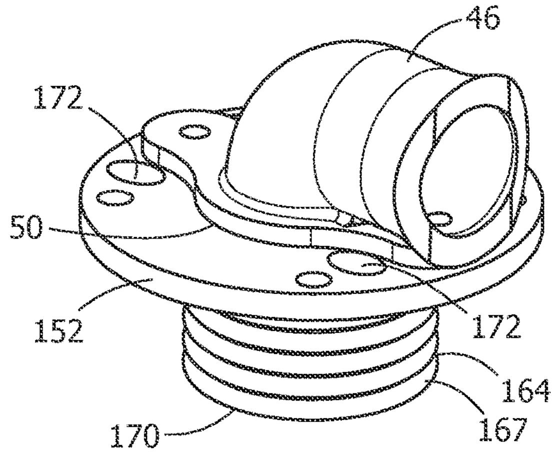
FIG. 11 is a top perspective view of a venturi plate and nozzle of the hydro-injector venturi system illustrated in FIG. 10, with the nozzle shown in the retracted position.
Figure 12:
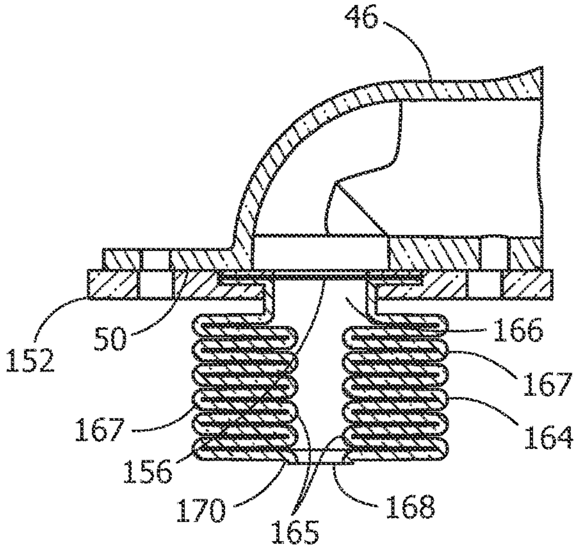
FIG. 12 is a cross-sectional view taken along line 12-12 of FIG. 11.

As shown in FIGS. 8 and 9, when assembled and in use, the chemical capsule or cartridge 40 is positioned in the activation chamber 34 of the cartridge holding member 14. In the illustrative embodiment shown, the cartridge 40 has a solid body 74 which is encapsulated by a supporting structure 76, such as, but not limited to a wall, film or coating. Openings 78 are provided in the supporting structure 76 to allow fluid 78 to interact and dissolve the chemicals of the solid body 74. In the embodiment shown, the openings 78 are provided at the top and bottom of the cartridge 40. When first positioned in the activation chamber 34, the cartridge 40 engages the bottom of the cartridge holding member 14. As the cartridge holding member 14 is moved into engagement with the fluid flow member 12, the cartridge 40 engages the telescoping partitions 64, causing them to be retracted or collapsed into the projection 58, as shown in FIG. 8.

The cartridge holding member 14 has a top portion 30, a bottom portion 32, and an activation chamber or cartridge receiving cavity 34. In the embodiment shown, the bottom portion 32 is integrally attached to the top portion 30. However, in other illustrative embodiments, the bottom portion 32 may have a cap (not shown) which is attachable to and removable from the top portion 30 to allow for the insertion of a chemical capsule or cartridge 40 (such as fertilizer or chlorine) into the activation chamber 34.

In order to utilize the present invention, a fluid line is attached to the inlet 18 of the fluid flow member 12. This fluid line will deliver pressurized fluid into the dispenser assembly 10. A second fluid line is attached to the outlet 20 of the fluid flow member 12. This fluid line will deliver the fluid, now in solution with the chemical from the cartridge 40 placed into the activation chamber 34 of the cartridge holding member 14, to its ultimate destination.

Once the fluid enters the inlet 18 of the fluid flow member 12, the fluid will flow into the hydro-injector member 46 in the hydro chamber 22. The fluid entering the inlet opening 44 of the hydro-injector member 46 is directed to or routed into the activation chamber or cartridge receiving cavity 34 of the cartridge holding member 14. The fluid so routed, flows through the outlet opening 48 of the hydro-injector member 46 and through the opening 56 of the venturi plate 52. The fluid is then routed through the opening 66 in the first telescoping partition 64*a* into the activation chamber or cartridge receiving cavity 34 of the cartridge holding member 14.

Once the fluid is in the activation chamber 34, the interaction of the fluid with the chemical capsule or cartridge 40 causes the capsule to erode. This forces the capsule's chemical into solution with the fluid which is in the activation chamber 34. This solution exits the cartridge holding member 14 through the outlet openings 72 in the venturi plate 52. Thereafter, the solution exits the dispenser assembly outlet 20 of the fluid flow member 12.

The concentration of chemical in solution is controlled and held constant or approximately constant by the use of the projection 58 and the telescoping partitions 64. As the fluid is routed into the activation chamber 34 of the cartridge holding member 14, the fluid interacts with the first telescoping partition 64*a*, exerting a force on the first telescoping partition 64*a* in a direction toward the cartridge 40. The force causes the first telescoping partition 64*a* to be maintained proximate to or in contact with the top of the cartridge 40, thereby causing the fluid to be directed to the cartridge 40, reducing the amount of fluid fan out in the activation chamber 34. In so doing, the rate of erosion of the chemical cartridge 40 can be better controlled.

As the flow of fluid continues, the top of the solid body 74 of the cartridge 40 is eroded or dissolved, causing the top of the solid body 74 to be moved away from the venturi plate 52. As this occurs, the force exerted on the first telescoping partition 64*a* causes the first telescoping partition 64*a* to move downward through the opening 78 of the cartridge 40 and be maintained proximate to or in contact with the top of the cartridge 40. Consequently, the fluid is continued to be directed to the cartridge 40, reducing the amount of fluid fan out in the activation chamber 34. In so doing, the rate of erosion of the chemical cartridge 40 can be better controlled and is consistent as the cartridge 40 is eroded or dissolved.

Continued flow of fluid causes the top of the solid body 74 to be moved further away from the venturi plate 52. As this occurs, the force exerted on the first telescoping partition 64*a* causes the first telescoping partition 64*a* to move downward and be maintained proximate to or in contact with the top of the cartridge 40. As the first telescoping partition 64*a* continues to move, the first locking should 68*a* engages the second locking shoulder ?Ob of the second telescoping partition 64*b*. As force is continued to be applied to the first telescoping partition 64*a*, the engagement of the first locking should 68*a* with the second locking shoulder ?Ob causes the second telescoping partition 64*b* to move downward with the first telescoping partition 64*a*. This allows the first telescoping partition 64*a* to remain proximate to or in contact with the top of the cartridge 40. Consequently, the fluid is continued to be directed to the cartridge 40, reducing the amount of fluid fan out in the activation chamber 34. In so doing, the rate of erosion of the chemical cartridge 40 can be better controlled and is consistent as the cartridge 40 is eroded or dissolved.

The operation of the second telescoping partition 64*b*, the third telescoping partition 64*c*, the fourth telescoping partition 64*d* and the fifth telescoping partition 64*e* are similar to that described. As the telescoping partitions 64 are moveable relative to each other and allow for the telescoping partition 64 to expand or telescope as described, the first telescoping partition 64*a* remains proximate to or in contact with the top of the cartridge 40, causing the fluid to be directed to the cartridge 40 throughout the process, reducing the amount of fluid fan out in the activation chamber 34. In so doing, the rate of erosion of the chemical cartridge 40 is controlled and is consistent regardless of the amount of erosion of the cartridge 40.

An alternate illustrative embodiment of the invention is shown in FIGS. 10-15. In this embodiment, many of the components are similar to or identical to the components in the first illustrative embodiment shown in FIGS. 1-9. For those components which are similar to or identical, the same numbers will be used. For the sake of brevity, the detailed description of all of the components will not be repeated, but are incorporated by reference.

A venturi plate 152 is positioned in engagement with the surface 50 of the hydro-injector member 46. The venture plate is attached to the hydro-injector member 46 and the fluid flow member 12 by mounting hardware 154. However, other methods of attaching the venturi plate 152 and hydro-injector member 46 may be used.

An opening 156 extends through the venturi plate 152. In the illustrative embodiment shown, the opening 156 is provided proximate the center of the venturi plate 152, although other configurations of the venturi plate 152 may be used. When assembled, the opening 156 of the venturi plate 152 is positioned in alignment with the outlet opening 48 of the hydro-injector member 46.

Extending from the venturi plate 152 is an expandable member 164. The expandable member 164 has a bellows like configuration with a series of peaks 165 and valleys 167. The expandable member 164 has a first opening 166 and a second opening 168. The first opening 166 extends about the circumference of the opening 156. The second opening 168 is positioned at a free end 170 of the expandable member 164 and is spaced from the first opening 166. The expandable member 164 may be integrally formed from the venturi plate 152 or may be fixed attached to the venturi plate 152. The expandable member 164 extends from the venturi plate 152 into the activation chamber 34.

Outlet openings 172 extend through the venturi plate 152. In the illustrative embodiment shown, four outlet openings 172 are provided. However, other numbers and positioning of the outlet openings 172 on the venturi plate 152 may be provided.

Figure 14:
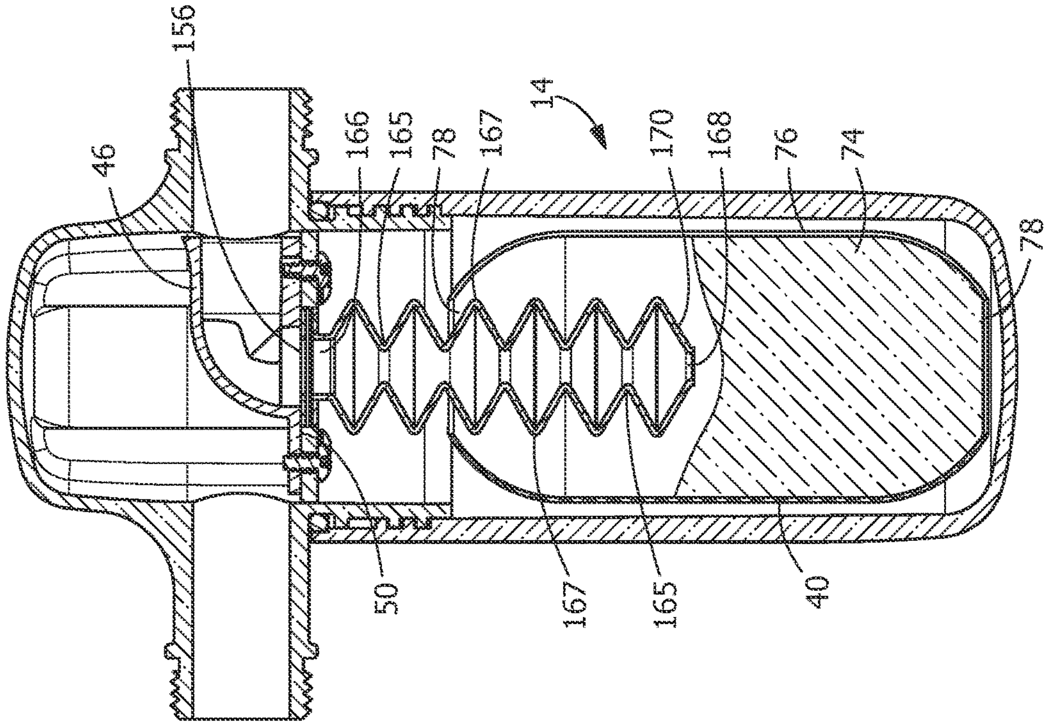
FIG. 14 is a cross-sectional view similar to that of FIG. 13, illustrating the controlled release apparatus with a partially dissolved cartridge positioned in the activation chamber, the nozzle is shown in the partially extended position.
Figure 13:
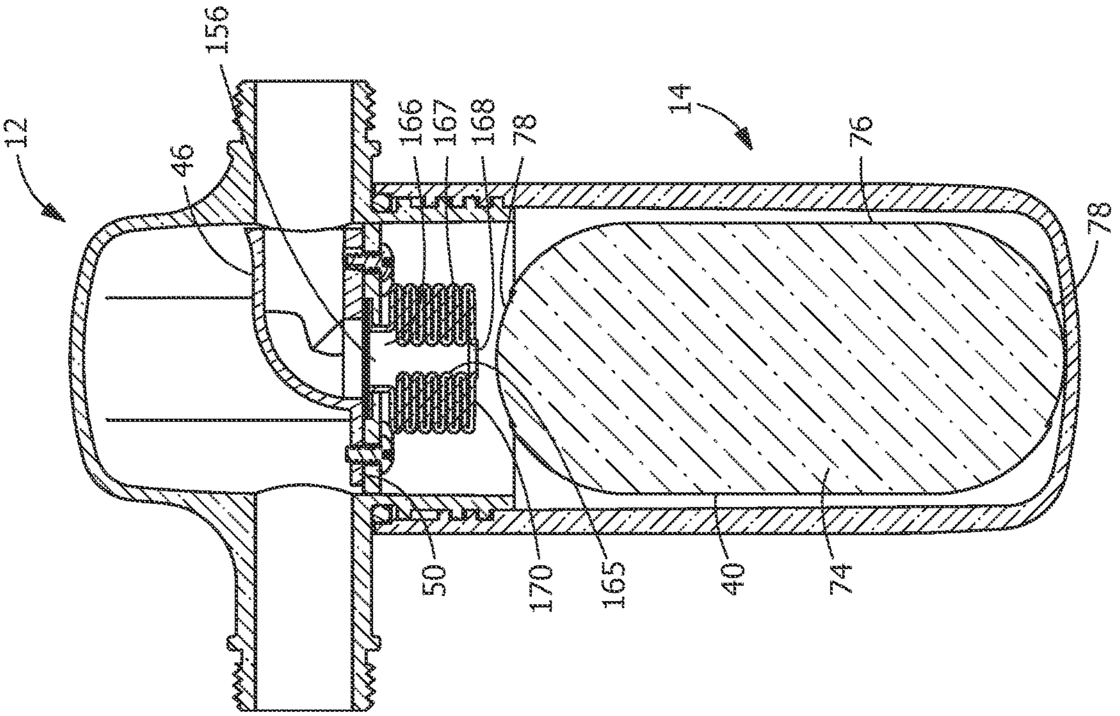
FIG. 13 is a cross-sectional view taken along line 13-13 of FIG. 10, illustrating the controlled release apparatus with a fully intact cartridge positioned in an activation chamber, the nozzle is shown in the retracted position.
Figure 15:
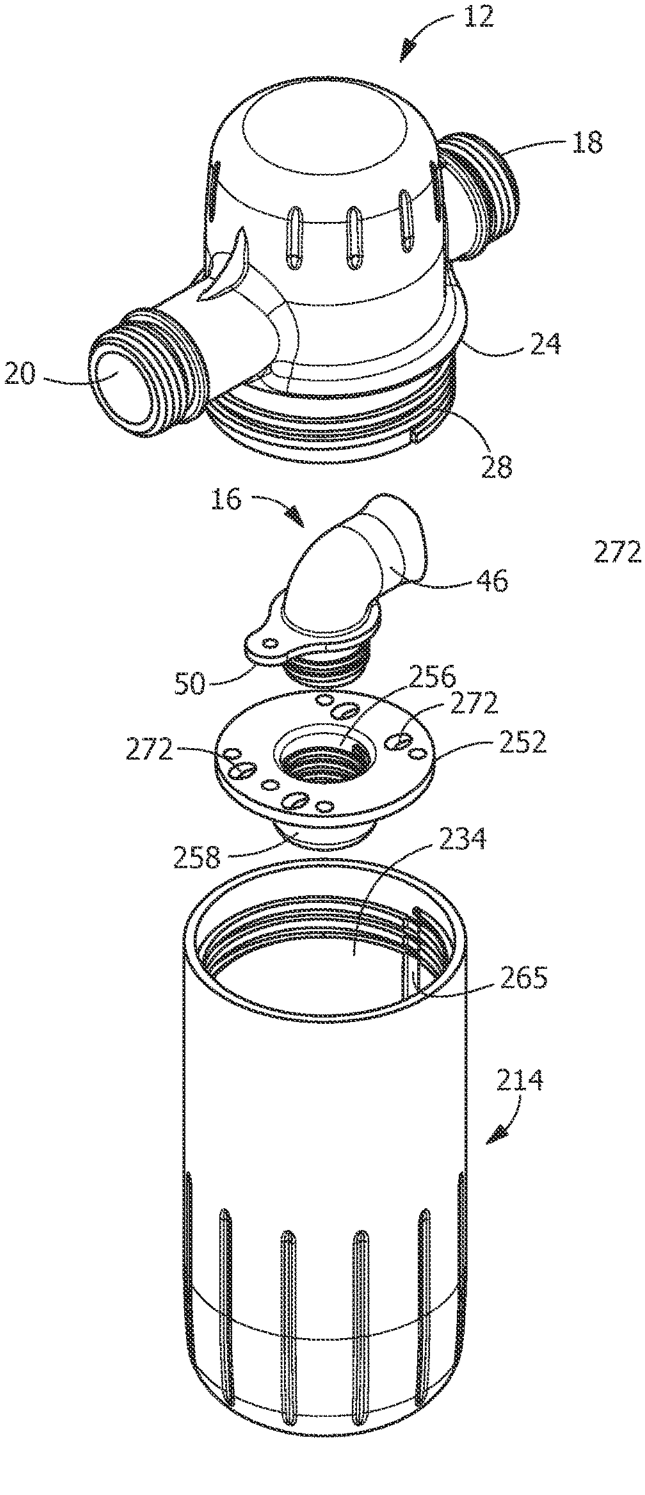
FIG. 15 is an exploded perspective view of a third illustrative embodiment of a controlled release apparatus.
Figure 16:
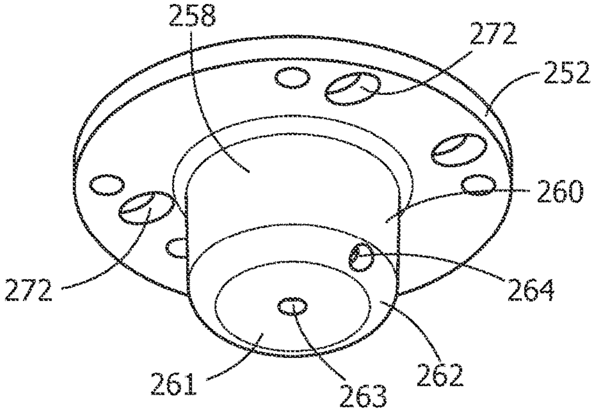
FIG. 16 is a bottom perspective view of a venturi plate and nozzle of the hydro-injector venturi system illustrated in FIG. 15, with the nozzle shown in the retracted position.
Figure 17:
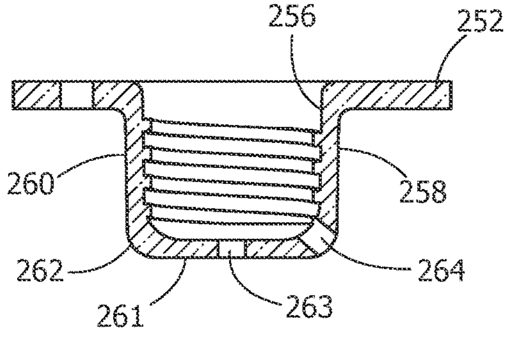
FIG. 17 is a cross-sectional view taken along line 17-17 of FIG. 16.

As shown in FIGS. 13 and 14, when assembled and in use, the chemical capsule or cartridge 40 is positioned in the activation chamber 34 of the cartridge holding member 14. In the illustrative embodiment shown, the cartridge 40 has a solid body 74 which is encapsulated by a supporting structure 76, such as, but not limited to a wall, film or coating. Openings 78 are provided in the supporting structure 76 to allow fluid 78 to interact and dissolve the chemicals of the solid body 74. In the embodiment shown, the openings 78 are provided at the top and bottom of the cartridge 40. When first positioned in the activation chamber 34, the cartridge 40 engages the bottom of the cartridge holding member 14. As the cartridge holding member 14 is moved into engagement with the fluid flow member 12, the cartridge 40 engages the free end 170 of the expandable member 164, causing the expandable member 164 to be positioned in a retracted or collapsed position, as shown in FIG. 13.

In this illustrative embodiment, the concentration of chemical in solution is controlled and held constant or approximately constant by the use of the expandable member 164. As the fluid is routed into the activation chamber 34 of the cartridge holding member 14, the fluid interacts with the expandable member 164, exerting a force on the peaks 165 and valleys 167 of the expandable member 164 in a direction toward the cartridge 40. The force causes the expandable member 164 to move downward through the opening 78 of the cartridge 40, which positions the free end 170 of the expandable member 164 to be maintained proximate to or in contact with the top of the cartridge 40, as shown in FIG. 14. This causes the fluid to be directed to the cartridge 40, reducing the amount of fluid fan out in the activation chamber 34. In so doing, the rate of erosion of the chemical cartridge 40 can be better controlled.

Another alternate illustrative embodiment is shown in FIGS. 15-19. In this embodiment, many of the components are similar to or identical to the components in the first illustrative embodiment shown in FIGS. 1-9. For those components which are similar to or identical, the same numbers will be used. For the sake of brevity, the detailed description of all of the components will not be repeated, but are incorporated by reference.

A venturi plate 252 is positioned in engagement with the surface 50 of the hydro-injector member 46. The venture plate is attached to the hydro-injector member 46 and the fluid flow member 12 by mounting hardware (not shown) However, other methods of attaching the venturi plate 252 and hydro-injector member 46 may be used.

An opening 256 extends through the venturi plate 252. In the illustrative embodiment shown, the opening 256 is provided proximate the center of the venturi plate 252, although other configurations of the venturi plate 252 may be used. When assembled, the opening 256 of the venturi plate 152 is positioned in alignment with the outlet opening 48 of the hydro-injector member 46.

Extending about the circumference of the opening 256 is a projection 258. The projection 258 is integrally formed from the venturi plate 252. The projection 258 extends from the venturi plate 252 into the activation chamber 34. The projection 258 has a side wall 260 and a bottom wall 261. A transition or angled wall 262 extends between the side wall 260 and the bottom wall 261. A first inlet opening 263 extends through the bottom wall 261 and a second inlet opening 264 extends through the angled wall 262. The first inlet opening 263 is provided proximate the center of the bottom wall 261, although other configurations of the venturi plate 252 may be used.

Outlet openings 272 extend through the venturi plate 252. In the illustrative embodiment shown, four outlet openings 272 are provided. However, other numbers and positioning of the outlet openings 272 on the venturi plate 252 may be provided.

In the illustrative embodiment, the cartridge holding member 214 has a longitudinally extending first indentation or channel 265 which extends along a side surface of the activation chamber 234. A second indentation or channel 266 extends along a bottom surface of the activation chamber 234. The second channel 266 is provided in line with the first channel 265. The second channel 266 extends from the side surface of the activation chamber 234 to proximately the center of the bottom surface of the activation chamber 234. The second inlet opening 264 is spaced from, but positioned in line with the first channel 265.

Figure 19:
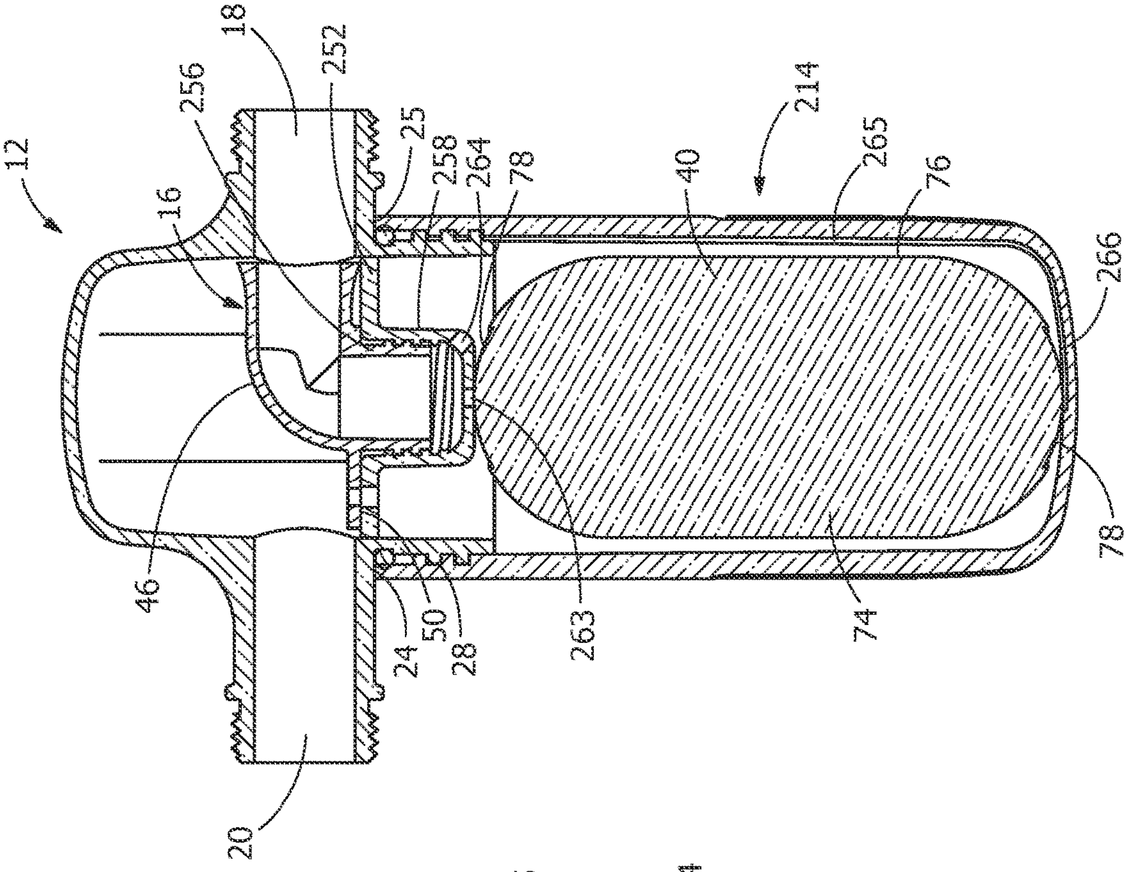
FIG. 19 is a top perspective view of a cartridge holding member of the controlled release apparatus of FIG. 15.
Figure 18:
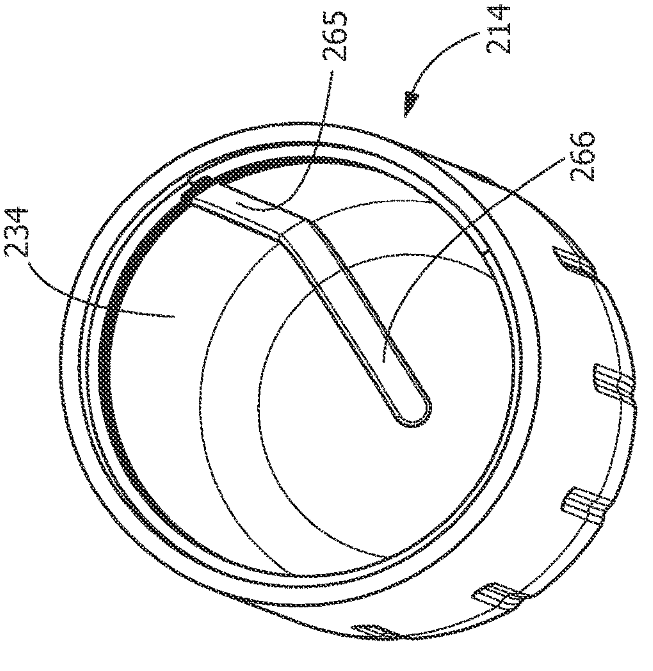
Figure 20:
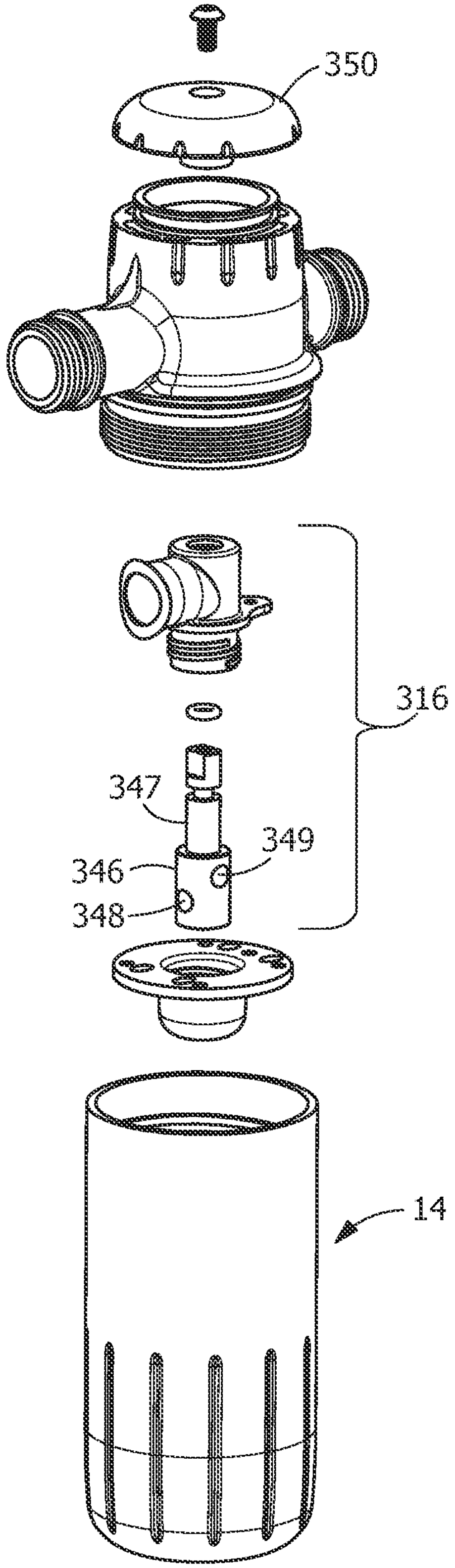
FIG. 20 is an exploded perspective view of a fourth illustrative embodiment of a controlled release apparatus.
Figure 21:
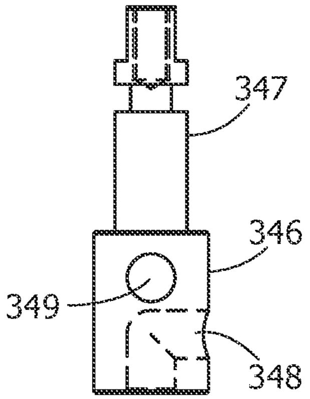
FIG. 21 is a front view of a switching mechanism illustrated in FIG. 20 illustrating a first flow path in phantom.
Figure 22:
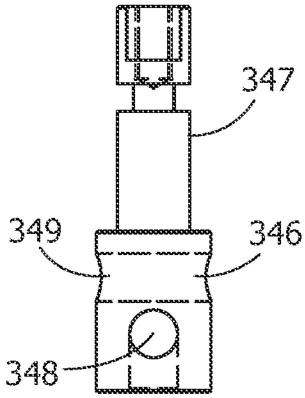
FIG. 22 is a side view of the switching mechanism illustrated in FIG. 21 illustrating a second flow path in phantom.
Figure 23:
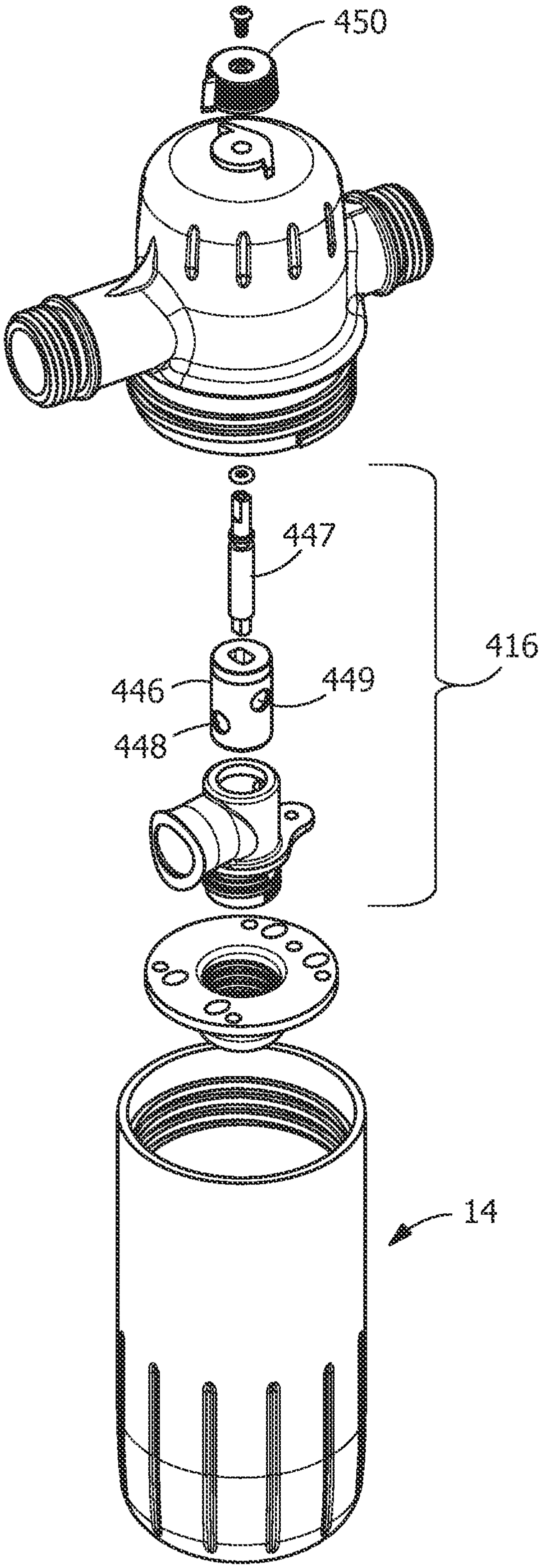
FIG. 23 is an exploded perspective view of a fifth illustrative embodiment of a controlled release apparatus.

As shown in FIG. 19, when assembled and in use, the chemical capsule or cartridge 40 is positioned in the activation chamber 234 of the cartridge holding member 214. In the illustrative embodiment shown, the cartridge 40 has a solid body 74 which is encapsulated by a supporting structure 76, such as, but not limited to a wall, film or coating. Openings 78 are provided in the supporting structure 76 to allow fluid 78 to interact and dissolve the chemicals of the solid body 74. In the embodiment shown, the openings 78 are provided at the top and bottom of the cartridge 40. When first positioned in the activation chamber 234, the cartridge 40 engages the bottom of the cartridge holding member 214.

In this illustrative embodiment, the concentration of chemical in solution is controlled and held constant or approximately constant by the use of the first inlet opening 265 and the second inlet opening 266. The fluid is routed into the activation chamber 234 of the cartridge holding member 214 by both the first inlet opening 265 and the second inlet opening 266.

The fluid the enters through the first inlet opening 265 is directed to the top of the cartridge 40. The fluid that enters through the first inlet opening 265 interacts and dissolves the top of the cartridge 40. The fluid the enters through the second inlet opening 266 is directed the first channel 265 and through the first channel 265 to the second channel 266. The fluid so directed interacts with the bottom of the cartridge 40 to dissolve the bottom of the cartridge 40. As the fluid interacts with the cartridge 40 from both the top and the bottom, the rate of erosion of the chemical cartridge 40 can be better controlled.

As the cartridge 40 is spaced from the side surfaces of the activation chamber 234 of the cartridge holding member 214, the fluid which enters the activation chamber 234 from the second inlet opening 266 is also moved to the bottom of the cartridge holding member 214 through the space provided between the cartridge 40 and the side surfaces of the activation chamber 234 of the cartridge holding member 214. This also facilitates the interaction of the fluid with the bottom of the cartridge 40.

The angle of the second inlet opening 266 relative to the plane of the bottom wall 261 governs the velocity of the fluid at the bottom of the cartridge 40. In the embodiment shown, the second inlet opening 266 is orientated at an angle of between 30 degrees and 60 degrees relative to the plane of the bottom wall 261, but the second inlet opening 266 may be oriented at other angles.

Other alternate illustrative embodiments are shown in FIGS. 20-23. In this embodiment, many of the components are similar to or identical to the components in the first illustrative embodiment shown in FIGS. 15-19. For those components which are similar to or identical, the same numbers will be used. For the sake of brevity, the detailed description of all of the components will not be repeated, but are incorporated by reference.

In these embodiments, the hydro-injector venturi systems 316, 416 have a hydro-injector member 346, 446 with an L-shape configuration. A rotatable valve 347, 447 is provided in the hydro-injector member 346, 446. The rotatable valve 347, 447 has a first flow chamber 348, 448 and a second flow chamber 349, 449. The first flow chamber 348, 448 has an L-shaped configuration. The second flow chamber 349, 449 has a straight configuration. The rotatable valve 347, 447 is attached, either directly or indirectly to a turnable member 350, 450 which can be engaged by an operator to rotate the turnable member 350, 450 and the rotatable valve 347, 447 between a first position and a second position.

In the first position, the first flow chamber 348, 448 is positioned in line with the inlet 18 of the fluid flow member 12. This allows all of the fluid which enters the inlet 18 to be directed to the activation chamber 234.

In the second position, the second flow chamber 349, 449 is positioned in line with the inlet 18 of the fluid flow member 12. This allows all of the fluid which enters the inlet 18 to be directed to the outlet 20 of the fluid flow member, thereby allowing the fluid to bypass the activation chamber 234.

In positions between the first position and the second position, the amount of fluid which enters the first flow chamber 348, 448 and the second flow chamber 349, 449 can be controlled by the positioning of the rotatable valve 347,447. Consequently, as the amount of fluid which enters the activation chamber 234 is controlled, the rate of erosion of the chemical cartridge 40 can also be controlled.

The rotatable valves 347, 447 shown in FIGS. 20-23 are meant to be illustrative, as other configurations may be used. In addition, the rotatable valve 347, 447 can be used alone or in combination with the embodiments shown in FIGS. 1-19.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A dispenser assembly for controlled hydro-injection release of an erodible solid cartridge into a liquid comprising:

a fluid flow member having an inlet for attaching to a pressurized fluid line and an outlet;

a hydro chamber provided in the fluid flow member, the hydro chamber having a hydro-injector member positioned therein;

the hydro-injector member having an inlet opening which faces the inlet of the fluid flow member and outlet opening;

the hydro-injector member has a rotatable valve, the rotatable valve has a first flow chamber and a second flow chamber;

a cartridge holding member removably attached to the fluid flow member, the cartridge holding member configured to house the erodible solid cartridge in an activation chamber;

a plate positioned in engagement with the hydro-injector member;

the hydro-injector member has an L-shape configuration, the outlet opening faces the activation chamber of the cartridge holding member;

wherein the hydro-injector and the plate control the rate of erosion of the erodible solid cartridge.

2. The dispenser assembly as recited in claim 1, wherein the rotatable valve is attached, either directly or indirectly to a turnable member which can be engaged by an operator to rotate the turnable member and the rotatable valve between a first position and a second position.

3. The dispenser assembly as recited in claim 2, wherein in the first position, the first flow chamber is positioned in line with the inlet of the fluid flow member, allowing all of the fluid which enters the inlet to be directed to the activation chamber, in the second position, the second flow chamber is positioned in line with the inlet of the fluid flow member, allowing all of the fluid which enters the inlet to be directed to the outlet of the fluid flow member, thereby allowing the fluid to bypass the activation chamber, in positions between the first position and the second position, the amount of fluid which enters the first flow chamber and the second flow chamber can be controlled by the positioning of the rotatable valve.

4. The dispenser assembly as recited in claim 1, wherein the inlet of the fluid flow member is attachable to and removable from a pressurized fluid line, the outlet of the fluid flow member is attachable to and removable from a second fluid line.

5. The dispenser assembly as recited in claim 1, wherein a seal is provided between the fluid flow member and the cartridge holding member.

6. A dispenser assembly for controlled hydro-injection release of an erodible solid cartridge into a liquid comprising:

a fluid flow member having an inlet for attaching to a pressurized fluid line and an outlet;

a hydro chamber provided in the fluid flow member, the hydro chamber having a hydro-injector member positioned therein;

the hydro-injector member having an inlet opening which faces the inlet of the fluid flow member and outlet opening;

the hydro-injector member has a rotatable valve, the rotatable valve has a first flow chamber and a second flow chamber;

a cartridge holding member removably attached to the fluid flow member, the cartridge holding member configured to house the erodible solid cartridge in an activation chamber;

a plate positioned in engagement with the hydro-injector member, the plate is a venturi plate having an opening which extends through the venturi plate, the opening is provided proximate a center of the venturi plate and is in alignment with the outlet opening of the hydro-injector member;

wherein the hydro-injector and the plate control the rate of erosion of the erodible solid cartridge.

7. The dispenser assembly as recited in claim 6, wherein a projection extends circumferentially about the opening of the venturi plate, the projection is spaced from the opening and extends from the venturi plate into the activation chamber, the projection has a wall with a shoulder provided at a free end thereof.

8. The dispenser assembly as recited in claim 7, wherein outlet openings extend through the venturi plate.

9. A dispenser assembly for controlled hydro-injection release of an erodible solid cartridge into a liquid comprising:

a fluid flow member having an inlet for attaching to a pressurized fluid line and an outlet;

a hydro chamber provided in the fluid flow member, the hydro chamber having a hydro-injector member positioned therein;

the hydro-injector member having an inlet opening which faces the inlet of the fluid flow member and an outlet opening;

a cartridge holding member removably attached to the fluid flow member, the cartridge holding member configured to house the erodible solid cartridge in an activation chamber;

a plate positioned in engagement with the hydro-injector member;

a projection extending from the plate into the activation chamber, the projection having a first inlet opening and a second inlet opening, the projection has a side wall and a bottom wall, an angled wall extends between the side wall and the bottom wall, the first inlet opening extends through the bottom wall and the second inlet opening extends through the angled wall, the first inlet opening is provided proximate the center of the bottom wall;

wherein the first inlet opening directs fluid to a top of the cartridge to interact and dissolve the top of the cartridge and the second inlet opening directs fluid to a bottom of the cartridge to interact and dissolve the bottom of the cartridge.

10. The dispenser assembly as recited in claim 9, wherein the cartridge holding member has a longitudinally extending first indentation or channel which extends along a side surface of the activation chamber and a second indentation or channel which extends along a bottom surface of the activation chamber, the second channel is provided in line with the first channel, the second channel extends from the side surface of the activation chamber to proximately the center of the bottom surface of the activation chamber, the second inlet opening is spaced from, but positioned in line with the first channel.

11. The dispenser assembly as recited in claim 9, wherein the hydro-injector member has a rotatable valve, the rotatable valve has a first flow chamber and a second flow chamber.

12. The dispenser assembly as recited in claim 11, wherein the rotatable valve is attached, either directly or indirectly to a turnable member which can be engaged by an operator to rotate the turnable member and the rotatable valve between a first position and a second position.

13. The dispenser assembly as recited in claim 12, wherein in the first position, the first flow chamber is positioned in line with the inlet of the fluid flow member, allowing all of the fluid which enters the inlet to be directed to the activation chamber, in the second position, the second flow chamber is positioned in line with the inlet of the fluid flow member, allowing all of the fluid which enters the inlet to be directed to the outlet of the fluid flow member, thereby allowing the fluid to bypass the activation chamber, in positions between the first position and the second position, the amount of fluid which enters the first flow chamber and the second flow chamber can be controlled by the positioning of the rotatable valve.

14. The dispenser assembly as recited in claim 9, wherein the inlet of the fluid flow member is attachable to and removable from a pressurized fluid line, the outlet of the fluid flow member is attachable to and removable from a second fluid line.

15. The dispenser assembly as recited in claim 9, wherein a seal is provided between the fluid flow member and the cartridge holding member.

16. The dispenser assembly as recited in claim 9, wherein the hydro-injector member has an L-shape configuration, the outlet opening faces the activation chamber of the cartridge holding member.

17. The dispenser assembly as recited in claim 9, wherein the plate is a venturi plate.

18. The dispenser assembly as recited in claim 17, wherein outlet openings extend through the venturi plate.

* * * * *